United States Patent [19]

Yoshizawa et al.

[11] Patent Number: 5,096,563

[45] Date of Patent: Mar. 17, 1992

[54] METHOD OF MANUFACTURING OPTICAL DISK

[75] Inventors: Atsushi Yoshizawa; Fumio Matsui, both of Saitama, Japan

[73] Assignee: Pioneer Electronic Corporation, Tokyo, Japan

[21] Appl. No.: 700,434

[22] Filed: May 15, 1991

[30] Foreign Application Priority Data

Oct. 22, 1990 [JP] Japan .................................. 2-285518

[51] Int. Cl.$^5$ ......................... C25D 1/10; B29D 11/00
[52] U.S. Cl. ...................................... 205/68; 264/1.3; 264/2.5
[58] Field of Search ...................... 204/5; 264/1.3, 2.5

[56] References Cited

U.S. PATENT DOCUMENTS 5,015,338  5/1991  Tabuchi .................................. 204/5

Primary Examiner—T. M. Tufariello

Attorney, Agent, or Firm—Fleit, Jacobson, Cohn, Price, Holman & Stern

[57] ABSTRACT

An optical disk manufacturing method comprises a step of preparing a master disk having an elastomer layer, formed on a transparent substrate and containing photosensitive dyes, and a polymer support layer, formed on the elastomer layer and having a glass transition temperature; a step of forming minute bumps on the master disk by irradiation of a focusing laser beam; a step of forming a metal layer on that surface of the master disk which has the minute bumps; and a step of forming a stamper layer on that surface of the master disk which is rendered conductive, thereby forming a stamper. According to another optical disk manufacturing method, the metal stamper forming step is replaced with a step of forming a transfer layer, made of a transparent ultraviolet-ray hardening resin, on that surface of the master disk which has the minute bumps, thereby forming a resin stamper.

2 Claims, 2 Drawing Sheets

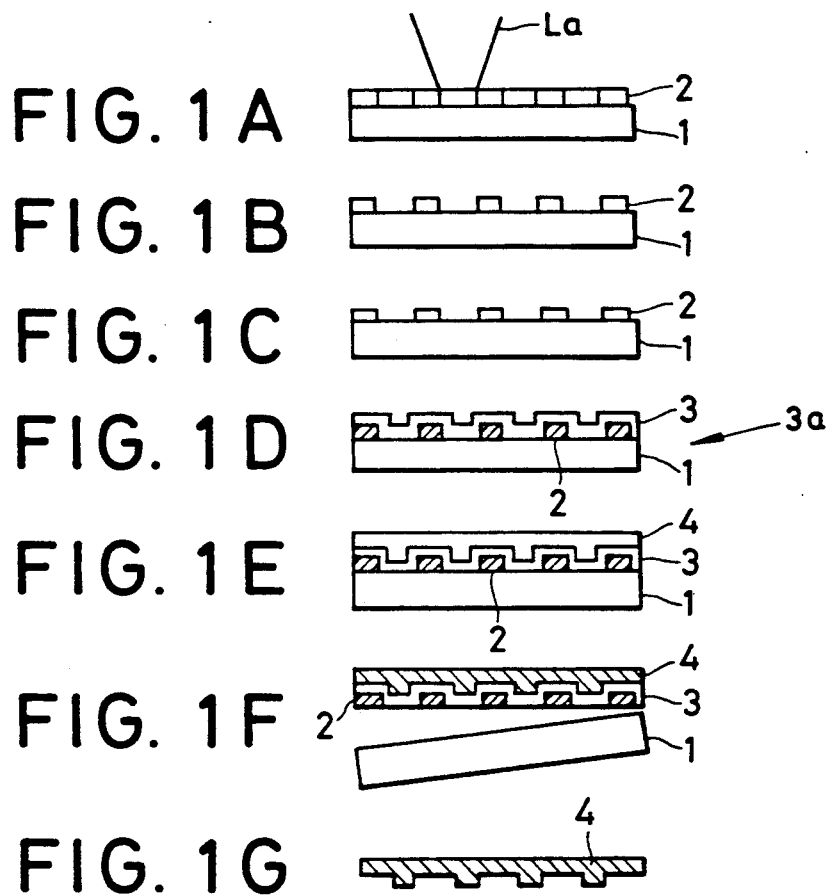
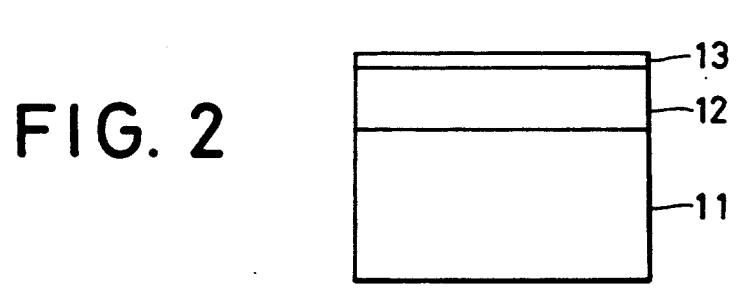

METHOD OF MANUFACTURING OPTICAL DISK

BACKGROUND OF THE INVENTION

1. Field of the Invention

The present invention relates to a method of manufacturing optical disks using a stamper.

2. Description of the Prior Art

A method as shown in FIG. 1 is generally known as a method of manufacturing optical disks such as video disks.

According to the conventional method, a photoresist master disk, comprising a photoresist layer 2 formed on the main surface of a glass disk 1 as shown in FIG. 1A, is prepared, and a laser beam La which flickers according to a predetermined signal is irradiated onto the photoresist layer 2 to helically or concentrically form a latent image of a row of spots corresponding to predetermined information. Then, the exposed photoresist master disk is developed to create a row of minute bumps (hereafter referred to as "pits") corresponding to a signal to be recorded on the photoresist master disk, thus producing a developed master disk which has the pits-carrying photoresist layer 2 (information recording layer) and the glass disk 1 as shown in FIG. 1B. The photoresist layer 2 of the developed master disk is dried and fixed (post-baked) on the glass disk 1 to produce a dried master disk as shown in FIG. 1C. Then, silver is spattered on the photoresist layer 2 to form a silver conductive film 3 thereon, creating a mastering disk 3a having a multi-layered structure as shown in FIG. 1D. As described above, sputtering metal on a photoresist layer having pits renders a pits-carrying information recording face conductive. The produced mastering disk is immersed in a nickel electroforming tank to plate the silver conductive film 3 with nickel (Ni). As a result, a thick nickel layer 4 i.e., a nickel stamper is made, providing a disk as shown in FIG. 1E. The stamper or the nickel layer 4 is separated from the glass disk 1, as shown in FIG. 1F. The photoresist layer 2 and the silver conductive film 3 are removed from the stamper, yielding a nickel stamper shown in FIG. 1G.

Then, the nickel stamper is attached to a predetermined position of an injection molding apparatus. After the nickel stamper is closed, a melted transparent resin, such as flowable PMMA (polymethyl methacrylate) or PC (polycarbonate), is injected onto the stamper. After the resin is hardened, it is separated from the stamper, providing an optical disk replica having a face on which predetermined information is to be recorded.

The replica produced in this manner has a reflection film, such as an aluminum film, on its information recording face by a known method. Further, a protective film is coated on the reflection film, forming an optical disk. In general, two optical disks formed in this manner are bonded together and subjected to a finishing process, the resultant structure serving as a double-sided optical disk.

The preparation of a stamper, however, involves many electroforming steps, and the plating takes time, as described above. Further, an injection molding apparatus for manufacturing a replica is relatively large. Since it takes much time to manufacture a stamper by the conventional method, this method is not fully adequate for manufacturing recent optical disks which deal with multifarious types of audio visual software in a small quantity.

SUMMARY OF THE INVENTION

It is therefore an object of the present invention to provide an optical disk manufacturing method, which is suitable for producing a small quantity but multifarious types of optical disks, or for mass production of optical disks.

An optical disk manufacturing method according to one aspect of the present invention comprises a step of preparing a master disk having an elastomer layer, formed on a transparent substrate and containing photosensitive dyes, and a polymer support layer, formed on the elastomer layer and having a glass transition temperature; a step of forming minute bumps on the master disk by irradiation of a focusing laser beam; a surface-electrifying step of forming a metal layer on that surface of the master disk which has the minute bumps; an electroforming step of forming and growing a stamper layer on that surface of the master disk which is rendered conductive, thereby forming a stamper; and a step of separating the master disk from the stamper.

An optical disk manufacturing method according to another aspect of the present invention comprises a step of preparing a master disk having an elastomer layer, formed on a transparent substrate and containing photosensitive dyes, and a polymer support layer, formed on the elastomer layer and having a glass transition temperature; a step of forming minute bumps on the master disk by irradiation of a focusing laser beam; and a transfer step of forming a transfer layer, made of a transparent ultraviolet-ray hardening resin, on that surface of the master disk which ha the minute bumps.

According to this invention, stamper producing time can be shortened, so that the method of manufacturing optical disks can be simplified.

BRIEF DESCRIPTION OF THE DRAWINGS

FIGS. 1A-1G is a schematic cross section illustrating members in individual steps of a conventional method for manufacturing an optical disk;

FIGS. 2 and 3 are schematic cross sections illustrating a dye-polymer master disk according to the present invention;

DETAILED DESCRIPTION OF THE PREFERRED EMBODIMENTS

Preferred embodiments of the present invention will now be described referring to the accompanying drawings.

According to an optical disk manufacturing method of one embodiment, a photoresist master disk is replaced with a master disk or dye-polymer master disk which comprises an elastomer layer 12, formed on a glass substrate 11 and containing photosensitive dyes, and a polymer support layer 13, formed on the layer 12 and having a glass transition temperature, as shown in FIG. 2. For example, an epoxy resin is used for the polymer support layer 13 of the dye-polymer master disk, and a silicon rubber containing a carbon black dye is used for the elastomer layer 12. Silicon rubber where a carbon black dye is dispersed is coated on the glass substrate 11 by a spin coating method to uniformly form the elastomer layer 12, and then an epoxy resin is coated to form the polymer support layer 13, thus acquiring the dye-polymer master disk.

Figure 3:
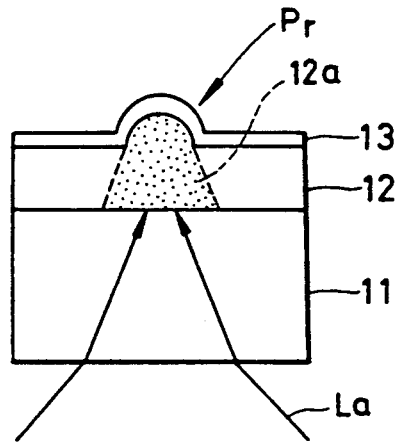

Information will be recorded on the dye-polymer master disk utilizing the property of the polymer support layer 13 that retains the thermal expansion deformation of the elastomer layer 12 containing organic photosensitive dyes, which is caused by exposure of a laser beam. As shown in FIG. 3, a laser beam La of a long wavelength to be absorbed only by the elastic elastomer layer 12 is irradiated onto the layer 12 to partially cause thermal expansion of the layer 12 in spot shape. The thermally expanded spot portion 12a of the elastomer layer 12 raises the support layer 13, thus providing minute bumps or protrusions Pr which result from viscoelastically stable deformation of the support layer 13.

Figure 4:
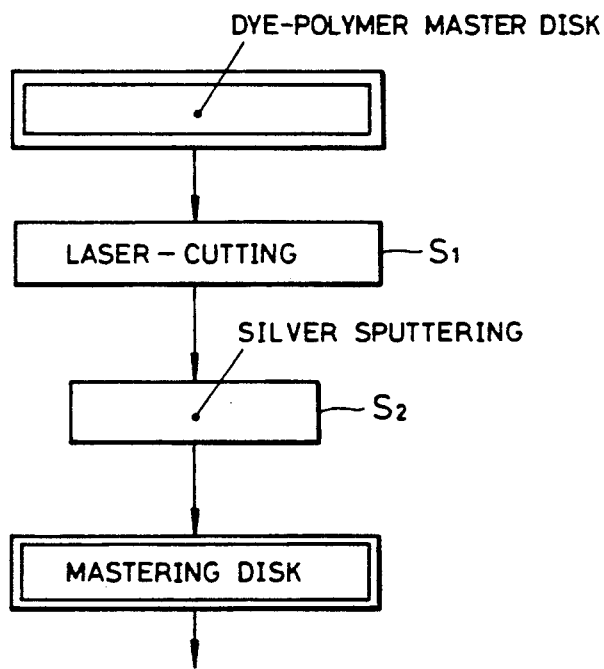
FIG. 4 is a flowchart showing the essential steps of the method for manufacturing an optical disk using the dye-polymer master disk according to the present invention.
Figure 5A:
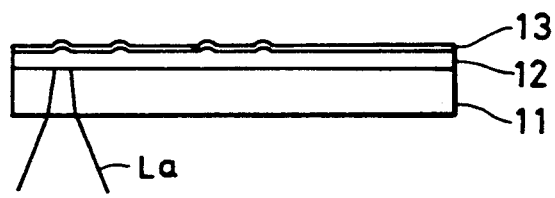
FIG. 5 is a schematic cross section illustrating the members in the steps in FIG. 4.
Figure 5B:
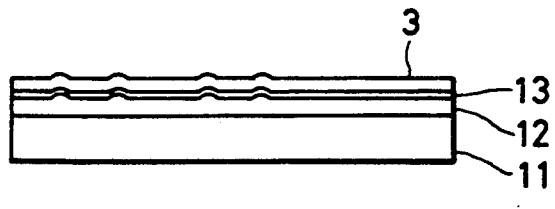

FIG. 4 is a flowchart showing the processes of manufacturing an optical disk replica of this embodiment until a mastering disk is prepared. According to the manufacturing method of this embodiment, the dye-polymer master disk including the elastomer layer 12 and the polymer support layer 13 as shown in FIG. 5A is prepared first. Then in laser cutting step S1, a row of the minute bumps Pr are formed on the polymer support layer 13 by radiating the laser beam La which flickers according to a predetermined signal. As a row of the minute bumps, which correspond to a signal which should be recorded on the master disk, have been formed, silver is spattered on the support layer 13 to form a silver conductive film 3 thereon in silver sputtering step S2, thereby yielding the mastering disk as shown in FIG. 5B.

In a nickel electroforming step, the acquired mastering disk is immersed in a nickel electroforming tank. As a result, a nickel stamper having a thick nickel layer is formed on the silver conductive film 3 acquired. The nickel stamper is then separated together with the silver conductive film 3 from the dye-polymer master disk. The nickel stamper is produced in the above-described manner.

A replica and optical disks are formed from the nickel stamper through the same procedures as executed in the above-described conventional method.

In another embodiment, the silver conductive film is not formed on the polymer support layer 13, but the dye-polymer master disk, which has a row of minute bumps corresponding to a record signal, is directly used as a stamper to manufacture a replica. Used in this replica manufacturing process is a so-called 2P transfer method where a photopolymer, which is hardened by ultraviolet-rays irradiated thereon, serves as a transfer layer. According to this method, an information recording face is transferred on a replica substrate or a hardened PMMA substrate with a photopolymer agent for a replica, thus providing an optical disk replica.

More specifically, the produced dye-polymer master disk is securely placed horizontal on the table of a transfer device with the information recording face, i.e., the polymer support layer, set upward. The information recording face of the dye-polymer master disk is coated with liquid photopolymer agent for a replica, which can easily be peeled off from the polymer support layer. While the transparent PMMA disk is kept horizontal, it is disposed concentrical on the polymer support layer through the replica photopolymer agent. The photopolymer agent for a replica is spread all over and sandwiched between the PMMA disk and the dye-polymer master disk. Ultraviolet-rays are emanated from the PMMA disk side onto the replica photopolymer agent to harden it. Consequently, an information recording layer is formed, or transferred, as a transfer layer consisting of the hardened photopolymer agent for a replica, on the main surface of the PMMA disk.

Then, the PMMA disk is separated together with this information recording layer from the dye-polymer master disk, yielding an optical disk replica or a so-called 2P replica comprising the information recording layer of the photopolymer agent for a replica and the PMMA disk having the information recording layer.

From the replica as obtained in the above manner, a replica and an optical disk can also be produced using the conventional method.

According to the conventional manufacturing method using a photoresist disk, boring pits or minute recesses on a photoresist layer by a laser-cutting method creates a rim portion as a somma shape around each pit, and further the photoresist, when spattered, covers the surface of other photoresist layer. This influences a stamper to be produced, and results in waveform deformation and noise at the time information is reproduced from any acquired optical disk. According to the method of the present invention, however, since a row of the minute bumps corresponding to a record signal are formed directly on the polymer support layer of the dye-polymer master disk, a rim portion will not be created and nothing will be spattered, making it possible to provide optical disks with less noise.

In the optical disk manufacturing method of the present invention, as described above, minute bumps are formed on a dye-polymer master disk comprising an elastomer layer and a polymer support layer, the surface of the disk is rendered conductive to form a stamper by electroforming, or a transfer layer consisting of an ultraviolet-hardening resin is produced directly from the dye-polymer master disk having the minute bumps. Therefore, the procedures of manufacturing an optical disk can be simplified while realizing accurate transfer of an information recording face. This method is thus adequate for manufacturing optical disks which deal with multifarious types of audio visual software in a small quantity.

What is claimed is:

1. An optical disk manufacturing method comprising:
   a step of preparing a master disk having an elastomer layer, formed on a transparent substrate and containing photosensitive dyes, and a polymer support layer, formed on the elastomer layer and having a glass transition temperature;
   a step of forming minute bumps on the master disk by irradiation of a focusing laser beam;
   a surface-electrifying step of forming a metal layer on that surface of the master disk which has the minute bumps;
   an electroforming step of forming and growing a stamper layer on that surface of the master disk which is rendered conductive, thereby forming a stamper; and
   a step of separating the master disk from the stamper.

2. An optical disk manufacturing method comprising:
   a step of preparing a master disk having an elastomer layer, formed on a transparent substrate and containing photosensitive dyes, and a polymer support layer, formed on the elastomer layer and having a glass transition temperature;
   a step of forming minute bumps on the master disk by irradiation of a focusing laser beam; and
   a transfer step of forming a transfer layer, made of a transparent ultraviolet-ray hardening resin, on that surface of the master disk which has the minute bumps.

* * * * *